United States Patent
Michaut et al.

(10) Patent No.: US 12,546,442 B2
(45) Date of Patent: Feb. 10, 2026

(54) GUIDING STRUCTURE FOR A TOWER FOR LOADING/UNLOADING A TANK INTENDED FOR STORING AND/OR TRANSPORTING LIQUEFIED GAS

(71) Applicant: GAZTRANSPORT ET TECHNIGAZ, Saint Remy les Chevreuse (FR)

(72) Inventors: Erwan Michaut, Saint-Remy-les-Chevreuse (FR); Fabien Pesquet, Saint-Remy-les-Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 540 days.

(21) Appl. No.: 18/004,349

(22) PCT Filed: Jul. 6, 2021

(86) PCT No.: PCT/FR2021/051247
§ 371 (c)(1),
(2) Date: Jan. 5, 2023

(87) PCT Pub. No.: WO2022/008839
PCT Pub. Date: Jan. 13, 2022

(65) Prior Publication Data
US 2023/0288027 A1    Sep. 14, 2023

(30) Foreign Application Priority Data
Jul. 9, 2020  (FR) ...................................... 2007272

(51) Int. Cl.
  *B63B 25/16*   (2006.01)
  *F17C 3/02*    (2006.01)
(52) U.S. Cl.
  CPC .............. *F17C 3/027* (2013.01); *B63B 25/16* (2013.01); *F17C 3/025* (2013.01);
(Continued)

(58) Field of Classification Search
  CPC .... F17C 3/00; F17C 3/02; F17C 3/025; F17C 3/027; F17C 3/04; F17C 2201/0157;
(Continued)

(56) References Cited

U.S. PATENT DOCUMENTS 9,440,712 B2 *   9/2016  Bougault ................ F17C 3/025
2015/0375830 A1  12/2015 Bougault et al.

FOREIGN PATENT DOCUMENTS

KR   10-2013-0036834 A   4/2013
KR   10-2013-0037210 A   4/2013
(Continued)

OTHER PUBLICATIONS

International Search Report issued on Oct. 22, 2021 in PCT/FR2021/051247 filed Jul. 6, 2021, 2 pages.

*Primary Examiner* — Lars A Olson
(74) *Attorney, Agent, or Firm* — Oblon, McClelland, Maier & Neustadt, L.L.P.

(57) ABSTRACT

A tank for transporting and/or storing a liquefied gas includes: a load-bearing structure, a plurality of walls each including, in a thickness direction of the wall, a thermally insulating layer resting against the load-bearing structure and a sealing membrane resting against the thermally insulating layer. The plurality of walls includes a bottom wall, and a guiding structure configured to receive a tower for loading and/or unloading the liquefied gas contained in the tank. The guiding structure includes a base bearing against the load-bearing structure. The thermally insulating layer includes one self-supporting heatproof panel, and a clearance delimited by a portion of the self-supporting heatproof panel and by the load-bearing structure, the clearance being configured to accommodate part of the base of the guiding structure.

14 Claims, 6 Drawing Sheets

(52) U.S. Cl.
CPC ............ *F17C 2201/0157* (2013.01); *F17C 2203/0358* (2013.01); *F17C 2221/033* (2013.01); *F17C 2223/0153* (2013.01); *F17C 2270/0107* (2013.01); *F17C 2270/0121* (2013.01)

(58) Field of Classification Search
CPC ........ F17C 2203/0358; F17C 2221/033; F17C 2223/0153; F17C 2270/0107; B63B 25/00; B63B 25/16; B63B 25/14
USPC ....................................................... 114/74 R
See application file for complete search history.

(56) References Cited

FOREIGN PATENT DOCUMENTS

| | | | |
|---|---|---|---|
| KR | 10-2015-0039973 | A | 4/2015 |
| KR | 10-2015-0095240 | A | 8/2015 |
| WO | WO 2014/128381 | A1 | 8/2014 |

\* cited by examiner

GUIDING STRUCTURE FOR A TOWER FOR LOADING/UNLOADING A TANK INTENDED FOR STORING AND/OR TRANSPORTING LIQUEFIED GAS

The present invention relates to the field of tanks adapted to contain a liquefied gas. The invention more particularly concerns a bottom wall of a tank, for example of a gravity platform or of a terrestrial reservoir, for storing a liquefied gas, such as liquefied natural gas (LNG), for example, or liquefied petroleum gas (LPG).

In the prior art there are known sealed and thermally-insulating tanks for storing liquefied gas embarked in a gravity platform or a ship. They are generally equipped with a tower for loading/offloading the liquefied gas contained in the tank. The loading/offloading tower is generally suspended from an upper wall of a supporting structure, the supporting structure representing the basic structure of the gravity platform or of the internal hull of the ship. The tank may equally include a guiding structure that is fixed to the supporting structure of a bottom wall of the tank and/or a sump. The guiding structure is configured to maintain a bottom part of the loading/offloading tower in a given position relative to a horizontal plane whilst allowing movement in vertical translation of the loading/offloading tower.

The guiding structure is immersed in the liquefied gas when the tank contains the latter. It is therefore necessary to provide thermal insulation of the guiding structure and thermal continuity of the bottom wall of the tank through which the guiding structure passes. Now, the technical characteristics of the guiding structure sometimes make thermal insulation of the guiding structure and thermal continuity of the bottom wall difficult.

Moreover, gravity platform tanks have a much greater volume than ship tanks and offer only a limited resistance to operating loads and to point loads that are involved in loading or offloading the tank with liquefied gas. Moreover, the guiding structure is subjected to high mechanical and thermal stresses, in particular by the loading/offloading tower, a consequence of which is premature fatigue of the guiding structure and also of the bottom wall.

A first aim of the present invention is to alleviate at least one of the aforementioned disadvantages and further to confer other advantages by proposing a new type of wall for a liquefied gas storage and/or transport tank, in particular for a gravity platform.

A second aim of the invention is to increase the mechanical strength of the attachment of the guiding structure at the level of the bottom wall.

A third aim of the invention is to obtain better thermal insulation of the attachment of the guiding structure at the level of the bottom wall.

A fourth aim of the invention is to minimize structural deformations of the guiding structure.

The present invention therefore proposes a tank for the transport and/or the storage of a liquefied gas, including a supporting structure, a plurality of tank walls each including, in a thickness direction of the wall, at least one thermally-insulating layer resting against the supporting structure and at least one sealed membrane resting on the thermally-insulating layer, the plurality of tank walls including at least one bottom wall, a guiding structure configured to receive a tower for loading and/or offloading liquefied gas contained in the tank, the guiding structure being arranged against the supporting structure and extending at least in part inside the tank, the guiding structure including a base bearing against the supporting structure, the thermally-insulating layer including at least one self-supporting heat-proof panel that is at least in part disposed around the guiding structure, characterized in that the thermally-insulating layer includes a clearance delimited in the thickness direction of the bottom wall by a portion of the self-supporting heat-proof panel and by the supporting structure, the clearance being configured to accommodate at least in part the base of the guiding structure.

By "self-supporting" must be understood here, as well as in the rest of the application, that the self-supporting heat-proof panel is able to withstand the weight of something placed on top of it, for example liquefied natural gas, without deforming significantly and within the limit of its mechanical strength.

The clearance provided in the thermally-insulating layer made of self-supporting heat-proof panels is able to receive a portion of the base of the guiding structure. The self-supporting heat-proof panels are thus able to be located as close as possible to the guiding structure and thus to provide part of the thermal insulation of the guiding structure.

In accordance with one embodiment, the clearance has a thickness between 25 mm and 70 mm inclusive. The thickness is measured from an internal face of the supporting structure to an external face of the portion of the self-supporting heat-proof panels in a direction parallel to the thickness direction.

In accordance with one embodiment, the portion of the self-supporting heat-proof panel that delimits the clearance in the thickness direction includes a plywood or composite material board.

In accordance with one embodiment, a part of the portion of the self-supporting heat-proof panel rests on the base of the guiding structure, in particular on the plate of that base.

In accordance with one embodiment, a spacer device is disposed between the base of the guiding structure, in particular on the plate of that base, and the part of the portion of the self-supporting heat-proof panel resting on the base of the guiding structure.

In accordance with one embodiment, the spacer device is an insert or a bead of mastic or a combination of the two.

In accordance with one embodiment, the tank includes at least one locking device configured to immobilize the guiding structure in at least a direction perpendicular to the thickness direction of the bottom wall.

In accordance with one embodiment, the locking device is accommodated in the clearance.

In accordance with one embodiment, the locking device is made of metal.

In accordance with one embodiment, another part of the portion of the self-supporting heat-proof panel rests on the locking device.

In accordance with one embodiment, a locking member is arranged between the locking device and the other portion of the self-supporting panel.

In accordance with one embodiment, the locking member is an insert or a bead of mastic or a combination of the two.

In accordance with one embodiment, the clearance is delimited in a direction perpendicular to the thickness direction by an edge of the self-supporting heat-proof panel that extends between an external face of the portion of the self-supporting heat-proof panel and an internal face of the supporting structure and by the guiding structure.

In accordance with one embodiment, the locking device is arranged between the edge of the self-supporting heat-proof panel and the base of the guiding structure.

In accordance with one embodiment, a thermal-insulation member is disposed between the base of the guiding structure and the supporting structure. This thermal insulation member also has the function of adjusting the position along the vertical axis of the guiding structure.

In accordance with one embodiment, the thermal-insulation layer is a secondary thermal insulation layer and the sealed membrane is a primary sealed membrane and, the tank including a primary thermally-insulating layer and a secondary sealed membrane, the secondary sealed membrane rests against the secondary thermally-insulating layer, the primary thermally-insulating layer rests against the secondary sealed membrane, and the primary sealed membrane rests against the primary thermally-insulating layer.

In accordance with one embodiment, the primary thermally-insulating layer and/or the secondary thermally-insulating layer includes a plurality of self-supporting heat-proof panels, each self-supporting heat-proof panel including a block of polyurethane foam against which at least one plywood or composite material board is disposed.

In accordance with one embodiment, the supporting structure is made from a material chosen from the group comprising a metal, a metal alloy, concrete and mixtures thereof.

The invention further provides a transport and/or storage unit including at least one tank according to the invention, the transport and/or storage unit being chosen from the group including a methane tanker, a liquefied petroleum gas tanker, a barge, a reliquefication unit, a gasification unit, a terrestrial structure, for example a terrestrial reservoir, and a gravity platform.

In accordance with one embodiment, the transport and/or storage unit includes a base structure to which the tank according to the invention is anchored, the base structure being made of concrete.

The invention also proposes a transfer system for a liquefied gas, the system including a gravity platform according to the invention, insulated pipes arranged in such a manner as to connect the tank installed in the base structure of the gravity platform to a ship and a pump for driving a flow of liquefied gas through the insulated pipes from the tank of the gravity platform to the ship.

The invention further provides a method of loading or offloading a gravity platform according to the invention in which a liquefied gas is routed through insulated pipes from the tank of the gravity platform to a ship.

The content of the disclosure also includes a tank for transporting and/or storing a liquefied gas including a supporting structure, a plurality of tank walls each including, in a thickness direction of the wall, at least one thermally-insulating layer resting against the supporting structure and at least one sealed membrane resting against the thermally-insulating layer and intended to be in contact with the liquefied gas inside the tank, the plurality of tank walls including at least a bottom wall, and a guiding structure configured to receive a loading and/or offloading tower being arranged against the supporting structure, characterized in that the tank includes a plurality of locking devices secured to the supporting structure and in contact with a base of the guiding structure in such a manner as to block movement of the guiding structure in a direction perpendicular to the thickness direction of the bottom wall.

Other features and advantages of the invention will become more apparent in the course of the following description, on the one hand, and from a plurality of embodiments described by way of non-limiting illustration with reference to the appended schematic drawings, on the other hand, in which drawings.

It should first be noted that while the figures disclose the invention in a detailed manner for its execution, they may of course serve to define the invention better if necessary. It should also be noted that in all the figures elements that are similar and/or have the same function are indicated by the same numbers.

In the following description, a direction of a longitudinal axis L, a direction of a transverse axis T, and a direction of a vertical axis V are represented by a trihedron (L, V, T) in FIGS. 1 and 2 and FIGS. 4 and 5. A horizontal plane is defined as being a plane perpendicular to the vertical axis, a longitudinal plane as being a plane perpendicular to the transverse axis, and a transverse plane as being a plane perpendicular to the longitudinal axis.

The terms "external" and "internal" are used to define the relative position of one element with respect to another with reference to the interior and to the exterior of the tank.

Figure 1:
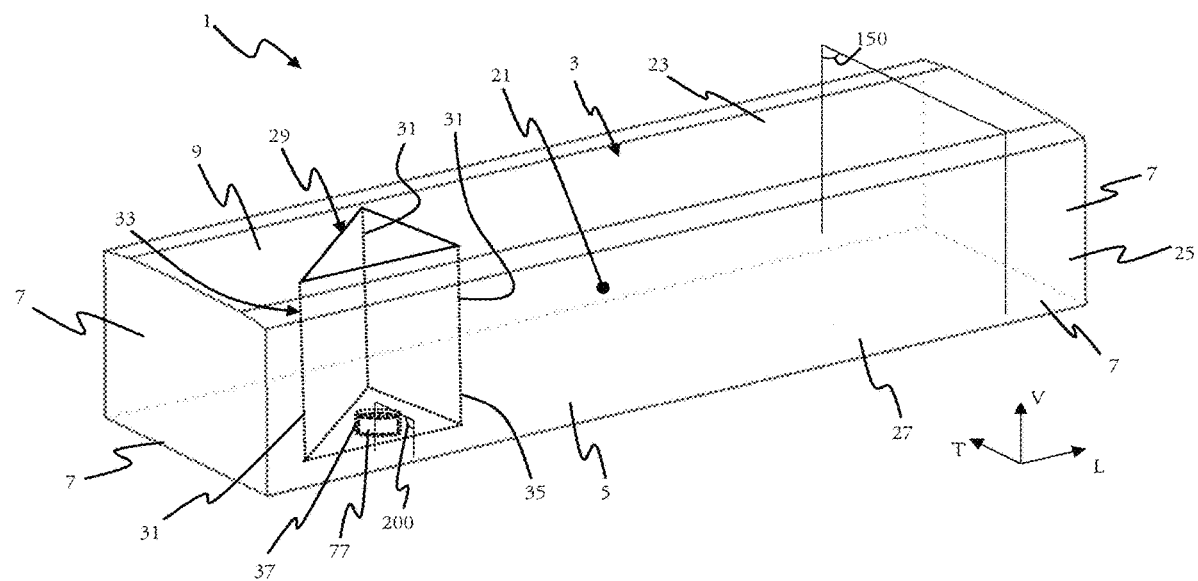
FIG. 1 is a schematic perspective view of a tank according to the invention.

Referring to FIG. 1, a sealed and thermally-insulating liquefied gas storage tank 21 is anchored in a concrete supporting structure 3. The supporting structure 3 is for example formed by a base structure of a gravity platform 1. Hereinafter the expressions "base structure" and "supporting structure" are used interchangeably and with the same reference number.

In an embodiment that is not represented, the supporting structure 3 is formed by the double hull of a ship. The ship may be a methane tanker or a liquefied petroleum gas tanker. The supporting structure 3 may also be formed by a double retaining structure, for example, of a barge, of a reliquefication unit, of a gasification unit, or of a terrestrial structure such as a terrestrial reservoir.

Figure 2:
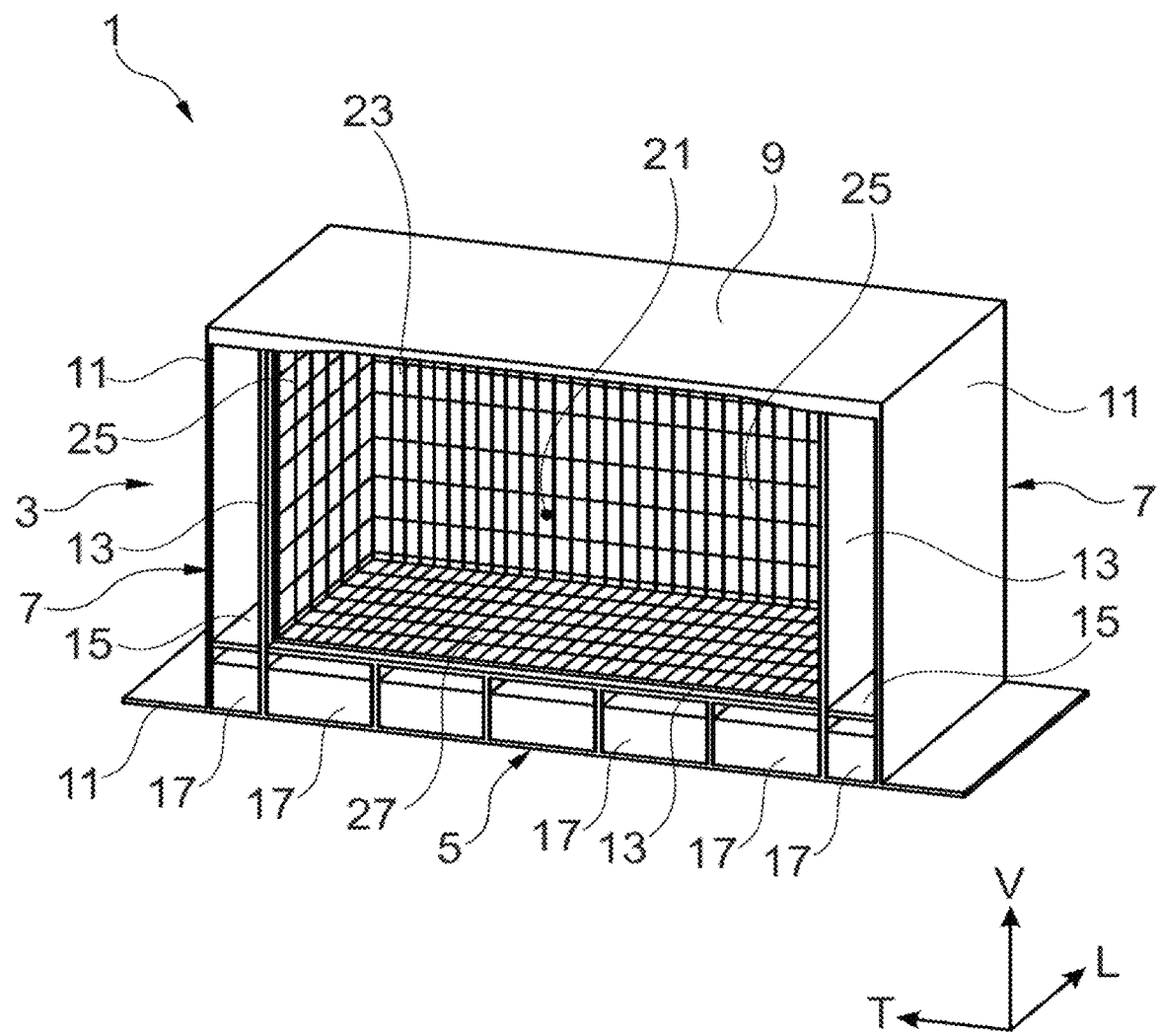
FIG. 2 is a schematic view in section on a transverse vertical plane of the tank from FIG. 1.

To be more precise, referring to FIG. 2, which is a view in section of the tank 21 from FIG. 1 on the section plane 150, the supporting structure 3 comprises a double bottom partition wall 5, an upper partition wall 9 and double lateral partition walls 7 connecting the double bottom partition wall 5 to the upper partition wall 9. Each double partition wall 5, 7 includes an external partition wall 11 and an internal partition wall 13 made of concrete. The internal partition walls 13 and the upper partition wall 9 define the general shape of the tank 21. The external partition walls 11 and the internal partition walls 13 are connected to one another by concrete spacers 15.

A lower part of the base structure 3 includes ballast compartments 17. The ballast compartments 17 are between the internal partition wall 13 and the external partition wall 11 of the double bottom partition wall 5. The ballast compartments 17 are filled with seawater when the gravity platform 1 is located at its exploitation location in such a manner as to submerge the gravity platform 1 by ballasting it. A result of this is that the gravity platform 1 rests in part on the seabed.

It will be noted that the base structure 3 also includes an insert, for example a metal insert, embedded in the concrete of the base structure. An insert of this kind extends horizontally, being disposed, in a vertical direction, under the guiding structure 77, which will be described hereinafter, between the latter and the concrete.

Figure 3:
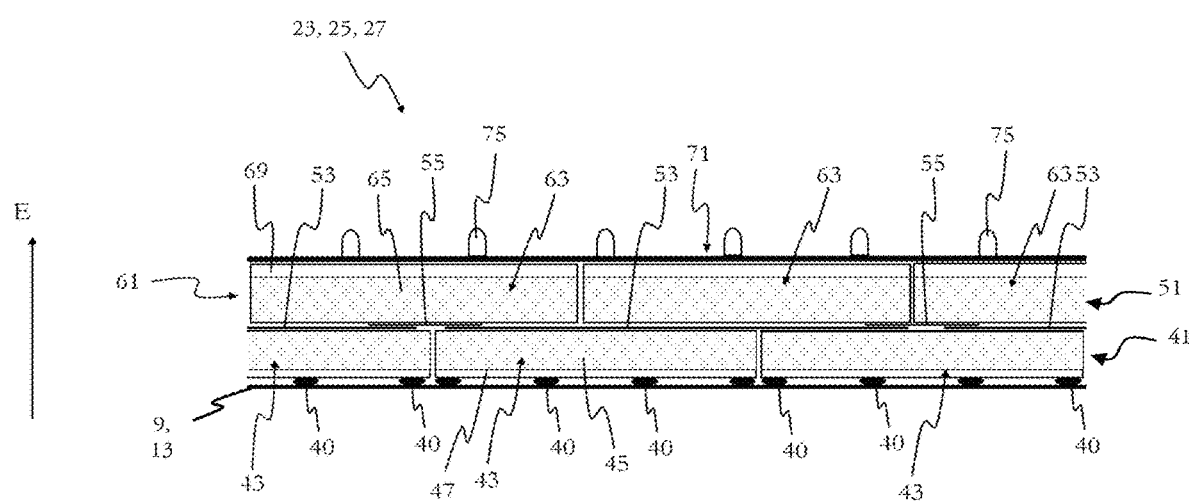
FIG. 3 is a schematic view of a structure of a wall of the tank from FIG. 2 as seen in a thickness direction of the wall.

Referring to FIG. 2 and to FIG. 3, the tank 21 includes a plurality of walls 23, 25, 27 each of which is disposed against an internal partition wall 13 and the upper partition wall 9 of the base structure 3. Accordingly, the tank 21 includes an upper wall 23 disposed on an internal face of the upper partition wall 7 and a bottom wall 27 disposed on an internal face of the internal partition wall 13. The upper partition wall 23 and the bottom wall 27 extend in a principal plane substantially parallel to the horizontal plane as defined above. The upper wall 23 is substantially parallel to and does not intersect the bottom wall 27. Here and in everything that follows it must be understood that by "substantially" is meant that the manufacturing tolerances and any assembly tolerances must be taken into account.

The upper wall 23 and the bottom wall 27 are connected to one another by lateral walls 25 disposed on an internal face of the other internal partition walls 13. The lateral walls 25 each extend in a plane substantially perpendicular to the horizontal plane from one edge of the bottom wall 27 to an edge of the upper wall 23. The tank 21 has a rectangular parallelepiped general shape.

Referring to FIG. 3, each wall 23, 25, 27 includes in a thickness direction E of the wall 23, 25, 27 a secondary thermally-insulating layer 41 retained on the respective partition wall of the base structure 3, a secondary sealed membrane 51 resting against the secondary thermally-insulating layer 41, a primary thermally-insulating layer 61 resting against the secondary sealed membrane 51, and a primary sealed membrane 71 intended to be in contact with the liquefied natural gas contained in the tank 21 and resting against the primary thermally-insulating layer 61.

The secondary thermally-insulating layers 41 of the walls 23, 25, 27 of the tank 21 communicate with one another in such a manner as to form between the base structure 3 and the secondary sealed membrane 51 a continuous and sealed secondary thermally-insulating space. Likewise, the primary thermally-insulating layers 61 of the walls 23, 25, 27 of the tank 21 communicate with one another in such a manner as to form between the secondary sealed membrane 51 and the primary membrane 71 a continuous and sealed primary thermally-insulating space.

The secondary thermally-insulating layer 41 includes a plurality of self-supporting heat-proof panels 43. The self-supporting heat-proof panels 43 have a substantially rectangular parallelepiped shape. The self-supporting heat-proof panels 43 may have other shapes, such as for example a parallelepiped shape, in particular with a square base or a rectangular base, or a right prism shape with a hexagonal base. The self-supporting heat-proof panels 43 are juxtaposed in parallel rows.

The self-supporting heat-proof panels 43 each include a block of heat-proof polymer foam 45 resting on an external rigid board 47. The rigid external board 47 is for example a plywood board. The rigid external board 47 is glued to said block of heat-proof polymer foam 45. The heat-proof polymer foam may in particular be a rigid foam based on polyurethane. Glass fibers may be embedded in the polyurethane foam to reinforce it. In an embodiment that is not represented the rigid external board 47 is made of at least one composite material.

Because of manufacturing inaccuracies, for example, the internal face of the internal partition walls 13 and the internal face of the upper partition wall 9 may have large differences from the theoretical area provided for the base structure. These differences are made up by causing the self-supporting heat-proof panels 41 to bear against the base structure by means of beads of polymerizable resin 40 or mastic.

The self-supporting heat-proof panels 41 are anchored to the internal partition walls 13 and to the upper partition wall 9 by means of studs, not shown, welded to the internal face of the internal partition walls 13.

The secondary sealed membrane 51 includes a plurality of rigid sealed layers 53 made from 0.07 mm thick aluminum foil sandwiched between two glassfiber mats impregnated with a polyamide resin. The rigid sealed layers 53 are glued to the blocks 45 of polymer foam of the self-supporting heat-proof panels 43, for example by means of a two-component polyurethane glue.

To confer some flexibility on the secondary membrane and to assure the continuity thereof between two contiguous rigid sealed layers 53 a flexible sealed layer 55 is glued to the adjacent peripheral rims of two contiguous rigid sealed layers 53. The flexible sealed layer 65 consists of a composite material comprising three layers: the two outer layers are glassfiber mats and the intermediate layer is a thin metal foil, for example an aluminum foil approximately 0.1 mm thick. This metal foil assures the continuity of the secondary sealed membrane.

The primary thermally-insulating layer 61 includes a plurality of self-supporting heat-proof panels 63 of substantially rectangular parallelepiped shape. The self-supporting heat-proof panels 63 of the primary thermally-insulating layer 61 may have other shapes, such as a cubic shape, for example. In the embodiment represented in FIG. 3 the self-supporting heat-proof panels 63 of the primary thermally-insulating layer 61 are offset relative to the self-supporting heat-proof panels 43 of the secondary thermally-insulating layer 41 so that each primary insulating panel 63 of the primary thermally-insulating layer 61 extends over four self-supporting heat-proof panels 43 of the secondary thermally-insulating layer 41.

Each self-supporting heat-proof panel 63 of the primary thermally-insulating layer 61 includes a block of heat-proof polymer foam 65, for example one based on rigid polyurethane. A first side of this block 65 of polymer foam is glued to the secondary sealed membrane 51 and a second side, opposite the first side, is covered by a rigid internal board 69. Glass fibers may be buried in the polymer foam to reinforce it. The rigid internal board 69 of the self-supporting heat-proof panel 63 of the primary thermally-insulating layer 61 is made for example of plywood or of composite material.

The primary sealed membrane 71 includes a plurality of metal plates that are welded to one another. In the embodiment illustrated in FIG. 3 the primary sealed membranes 71 includes corrugations 75 in the metal plates that enable it to be deformed by the effect of thermal and mechanical loads generated by the liquefied gas in the tank 21. The primary sealed membrane 71 includes two mutually-perpendicular series of corrugations 75. The corrugations 75 project toward the interior of the tank 21. The rigid internal board 69 of each self-supporting heat-proof panel 63 of the primary thermally-insulating layer 61 is equipped with metal assembly plates (not represented) for anchoring the corrugated metal sheets of the primary sealed membranes 71. The assembly plates may be assembled to one another, for example by welding.

Referring to FIG. 1, the tank 21 includes a guiding structure 77 arranged against the supporting structure 3. The guiding structure 77 is configured to receive a tower 29 for loading and/or offloading liquefied gas contained in the tank 21.

The loading/offloading tower 29 extends substantially all the height of the tank 21, that is to say from the lower wall to the upper wall from which its upper part 33 is suspended. The loading/offloading tower 29 includes three vertical masts 31 connected together by crossmembers (not represented) defining a prism shape of triangular section. The vertical masts 31 are hollow to allow the passage of electrical power supply cables (not represented) providing in particular a supply of electrical power to the pumps for offloading the tank 21 (not represented) via offloading lines (not represented) of the loading/offloading tower 29. In an embodiment that is not represented the loading/offloading tower 29 may include two vertical masts or four vertical masts.

The loading/offloading tower 29 includes in its bottom part 35 a guiding device 37 that cooperates with the guiding structure 77 of the tank 21. The guiding device 37 is aimed at allowing relative movement of the loading/offloading tower 29 with respect to the guiding structure 77 in the direction of height of the tank 21 in order to allow the loading/offloading tower 29 to contract or to expand as a function of the temperatures to which it is subjected whilst preventing horizontal movement of the lower part 31 of the loading/offloading tower 29.

The guiding structure 77 located in a zone of the bottom wall 27 of the tank 21 facing a central axis of the loading/offloading tower 29 will now be described in more detail with reference to FIG. 4, which is a view of the guiding structure on the section plane 200 indicated in FIG. 1. To simplify FIG. 4 the primary sealed membrane 71 and the secondary sealed membrane 51 have not been represented.

The guiding structure 77 includes a base bearing against the supporting structure 3.

The guiding structure 77 includes a hollow lower part 79 that is for example frustoconical and that is connected to an upper part 78 of right cylindrical shape. This lower part 79 is similar to the base of the guiding structure 77 referred to hereinabove. The upper part 78 projects into the tank 21 in such a manner as to cooperate with the guiding device 37 of the loading/offloading tower 29. The lower part 79 extends through the thickness of the bottom wall 27 of the tank 21 as far as the primary sealed membrane 71.

The lower part 79 or base includes at least one plate 93 bearing against the supporting structure 3, the plane in which most of the plate 93 extends being a plane perpendicular to the thickness direction E of the bottom wall 27. This plate 93 is the base part that extends in a clearance 151 formed in the thermally-insulating layer 41.

The frustoconical lower part or base 79 includes a small base 80 of circular shape and a large base 81 of circular shape. The small base 80 and the large base 81 are each developed in a plane perpendicular to the thickness direction E of the bottom wall 27. The small base 80 has a diameter less than the diameter of the large base 81. The upper part 78 has a diameter substantially equal to the diameter of the small base 80. Moreover, the large base 81 is closer to the supporting structure 3 than the small base 80. The lower part 79 includes a radial wall 88 that extends from a contour of the small base 80 as far as a contour of the large base 81. In other words, the radial wall 88 connects the small base 80 to the large base 81, forming a cone. The radial wall 88 extends circumferentially around the small base 80 and circumferentially around the large base 81. The small base 80 is assembled to the upper part 78 of the guiding structure 77 by means of a first plate 82 that extends in a plane perpendicular to the thickness direction E of the bottom wall 27. The first plate 82 may have various shapes. In the example represented the first plate 82 has a circular shape when seen in a plane perpendicular to the thickness direction E of the bottom wall 27. The first plate 82 has a diameter greater than the diameter of the small base 80. Accordingly, an exterior part 83 of the first plate 82 extends from the small base 80 in the direction of the primary sealed membrane 71 in order to be connected thereto. This exterior part 83 of the first plate 82 is disposed in continuity with the primary sealed membrane and contributes to its sealing and to its insulation. An interior part 84 of the first plate 82 extends in line with the exterior part 83 inside the lower part 79 of the guiding structure 77.

The guiding structure 77 includes a second plate 85 arranged between the small base 80 and the second base 81 of the lower part 79 of the guiding structure 77. The second plate 85 extends in a plane perpendicular to the thickness direction E of the bottom wall 27. The second plate 85 may have various shapes. In the example represented the second plate 85 has a circular shape when seen in a plane perpendicular to the thickness direction E of the bottom wall 27.

The second plate 85 is disposed in such a manner as to be in line with the secondary sealed membrane 51 in order to be connected thereto. The second plate 85 is therefore at substantially the same level as the secondary sealed membrane 51. An exterior part 86 of the second plate 85 extends around the lower part 73 of the guiding structure 77. This exterior part 86 of the second plate 85 is continuous with the secondary sealed membrane and contributes to its sealing and to its insulation. The exterior part 86 of the second plate 85 extends circumferentially from the radial wall 88 of the lower part 79 of the guiding structure 77. The exterior part 86 of the second plate 85 is intended to be connected to the secondary sealed membrane 41.

An interior part 87 of the second plate 85 extends inside the lower part 79 of the guiding structure 77. Accordingly, an interior space of the lower part 79 is divided into a secondary portion 90 and a primary portion 91. The primary portion 91 is therefore delimited by the first plate 82, the second plate 85 and the radial wall 88 of the lower part 79. The secondary portion 90 is delimited by the second plate 85, the double bottom partition wall 5 of the base structure 3 and the radial wall 88 of the lower part 79 of the guiding structure 77. A non-structural insulating packing (not represented) is arranged in the primary portion 91 and/or in the secondary portion 90. The non-structural insulating packing is for example glass wool, mineral wool or a mixture thereof. Thermal conduction in the guiding structure 77 is therefore limited.

The self-supporting heat-proof panels 63 of the primary thermally-insulating layer 61 adjacent to the guiding structure 77 bear on at least one self-supporting heat-proof panel 43 of the secondary thermally-insulating layer 41 and on the exterior part 86 of the second plate 85. The self-supporting heat-proof panels 63 of the primary thermally-insulating layer 61 adjacent to the guiding structure 77 also bear on the exterior part 86 of the second plate 85. A lateral face of the self-supporting heat-proof panels 63 of the primary thermally-insulating layer 61 adjacent to the guiding structure 77 is arranged against an edge of the exterior part 84 of the first plate 82. In order to improve the thermal insulation a non-structural insulating packing 92 is disposed between the self-supporting heat-proof panels 63 of the primary thermally-insulating layer 61 adjacent to the guiding structure 77 and the radial wall 88 of the lower part 79 of the guiding structure 77. The non-structural insulating packing 92 so disposed is for example glass wool, mineral wool or a mixture thereof.

The radial wall 88 of the lower part 79 includes through-holes 89. Some of the holes 89 in the radial wall 88 are arranged in such a manner as to establish aeraulic communication between the secondary thermally-insulating space and the secondary portion 90 of the interior space of the lower part 79. Circulation of an inert gas, such as nitrogen or argon for example, between the secondary thermally-insulating space and the secondary portion 90 is therefore facilitated. Some other holes 89 in the radial wall 88 are arranged in such a manner as to establish aeraulic communication between the primary thermally-insulating space and the primary portion 91 of the interior space of the lower part 79. Circulation of an inert gas, such as nitrogen or argon, for example, between the primary thermally-insulating space and the primary portion 91 is therefore facilitated.

The guiding structure 77 includes a plate 93 arranged circumferentially around the large base 81 of the lower part 79 of the guiding structure 77. The plate 93 extends in a plane perpendicular to the thickness direction E of the bottom wall 27. The plate 93 has a perimeter of square shape as seen in a plane perpendicular to the thickness direction E. The plate 93 bears against the internal partition wall 13 of the double bottom partition wall 5 of the supporting structure 3. In other words, the guiding structure 77 bears on the base formed at least in part by the plate 93 that is in plane-on-plane contact against the supporting structure 3. The plate 93 is fixed to the supporting structure 3 by a system of nuts and bolts (not represented).

A thermal-insulation member 94 is inserted between the internal face of the internal partition wall 13 and the plate 93 in such a manner as to break the thermal bridge between the supporting structure 3 and the guiding structure 77. The thermal-insulation member 94 is for example a plywood board or a composite material board. The thickness of this insulation member also contributes to the adjustment in the vertical direction of the height of the position of the guiding structure 77.

For disposition as close as possible to the self-supporting heat-proof panels of the secondary thermally-insulating layer 41, allowing for the plate 93 of the guiding structure 77, each self-supporting heat-proof panel 43 of the secondary thermally-insulating layer 41 adjacent to the plate 93 includes a cut-out 95. The cut-out 95 has a rectangular shape as seen in projection in a plane containing the thickness direction E of the bottom wall 27. The cut-out 95 is made in a lower part of the self-supporting heat-proof panel 43 of the secondary thermally-insulating layer 41 adjacent to the plate 93. The cut-out 95 is delimited by an upper intermediate portion 96 of the self-supporting heat-proof panel 43 of the secondary thermally-insulating layer 41 adjacent to the plate 93 and by an lateral intermediate edge 99 of the self-supporting heat-proof panel 43 of the secondary thermally-insulating layer 41 adjacent to the plate 93. The lateral intermediate edge 99 extends between an external intermediate face 97 of the upper intermediate portion 96 of the self-supporting heat-proof panel 43 of the secondary thermally-insulating layer 41 adjacent to the plate 93 and an internal face of the internal partition wall 13 of the double-bottom wall 5 of the supporting structure 3.

The upper intermediate portion 96 of the self-supporting heat-proof panel 43 of the secondary thermally-insulating layer 41 adjacent to the plate 93 includes a plywood board 98 or a composite material board arranged at the level of the external intermediate face 97. This makes it possible to reinforce the mechanical strength of the self-supporting heat-proof panel 43 of the secondary thermally-insulating layer 41 adjacent to the plate 93.

Accordingly, the secondary thermally-insulating layer 41 includes a clearance 151 delimited in the thickness direction E of the bottom wall 27 by the external intermediate face 97 of the upper intermediate portion 96 of the self-supporting heat-proof panel of the secondary thermally-insulating layer 41 adjacent to the plate 93 and by the internal face of the internal partition wall 13 of the bottom double wall 5 of the supporting structure 3. In other words, the clearance 151 is delimited in the thickness direction E of the bottom wall 27 by a portion of the self-supporting heat-proof panel 43 of the secondary thermally-insulating layer 41 adjacent to the plate 93 and by the supporting structure 3. The clearance 151 therefore accommodates at least in part the base, in particular the plate 93 of the guiding structure 77, in a direction parallel to the thickness direction E of the bottom wall 27.

The clearance 151 has a thickness H between 25 mm and 70 mm inclusive. The thickness H is measured in a direction parallel to the thickness direction E from the internal face of the internal partition wall 13 of the bottom double partition wall 5 of the supporting structure 3 to the external intermediate face 97 of the upper intermediate portion 96 of the self-supporting heat-proof panel 43 of the secondary thermally-insulating layer 41 adjacent to the plate 93. The thickness H of the clearance 151 is greater than or equal to a thickness of the plate 93 measured in a direction parallel to the thickness direction E of the bottom wall 27.

The clearance 151 is delimited in a direction perpendicular to the thickness direction E of the bottom wall 27 by the lateral intermediate edge 99 of the self-supporting heat-proof panel 43 of the secondary thermally-insulating layer 41 adjacent to the plate 93 and by the guiding structure 77. In other words, a length of the clearance 151 is greater than a length of the plate 93, the length being measured in the direction perpendicular to the thickness direction E of the bottom wall 27. The clearance 151 accommodates at least a part of the plate 93 in a direction perpendicular to the thickness direction E of the bottom wall 27.

The self-supporting heat-proof panels 43 of the secondary thermally-insulating layer 41 adjacent to the guiding structure 77 are in part in contact with an edge of the exterior part 86 of the second plate 85. In order to improve the thermal insulation, non-structural insulating packing 92 is disposed between the self-supporting heat-proof panel 43 of the secondary thermally-insulating layer 41 adjacent to the guiding structure 77 and the radial wall 88 of the lower part 79 of the guiding structure 77. A portion 97a of the external intermediate face 97 of the upper intermediate portion 96 of the self-supporting heat-proof panel 43 of the secondary thermally-insulating layer 41 adjacent to the plate 93 comes to rest on the portion of the plate 93 accommodated in the clearance 151. In order to make up at least in part the manufacturing tolerances of the plate 93 and/or of the self-supporting heat-proof panel 43 of the secondary thermally-insulating layer 41 adjacent to the plate 93, a spacer device 153 is arranged between the plate 93 and the portion of the external intermediate face 97 resting on the portion of the plate 93 accommodated in the clearance 151. The spacer device 153 is an insert or a bead of the mastic or a combination of the two. The insert may be made of plywood and/or of at least one composite material.

The spacer device 153 is one of the components that contributes to control of the vertical position of the guiding structure 77. In fact, it is necessary to align the exterior part 83 of the first plate 82 with the primary sealed membrane in the same plane. It is equally necessary to align the exterior part 86 of the second plate 85 in the same plane as the secondary sealed membrane. The spacer device 153 participates in the exercise of this function.

Figure 4:
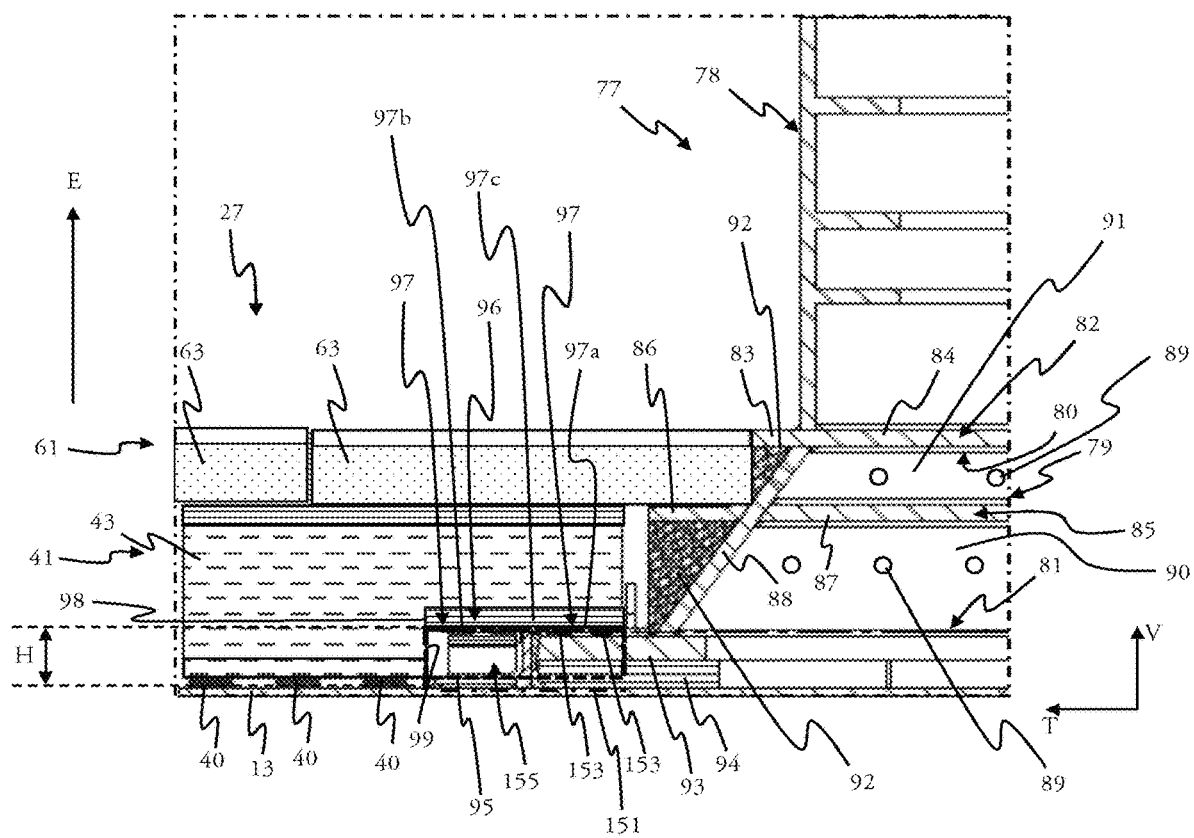
FIG. 4 is a detail view in section on a transverse vertical plane of a guiding structure from FIG. 1 intended to guide the loading/offloading tower from FIG. 1 in vertical translation.
Figure 5:
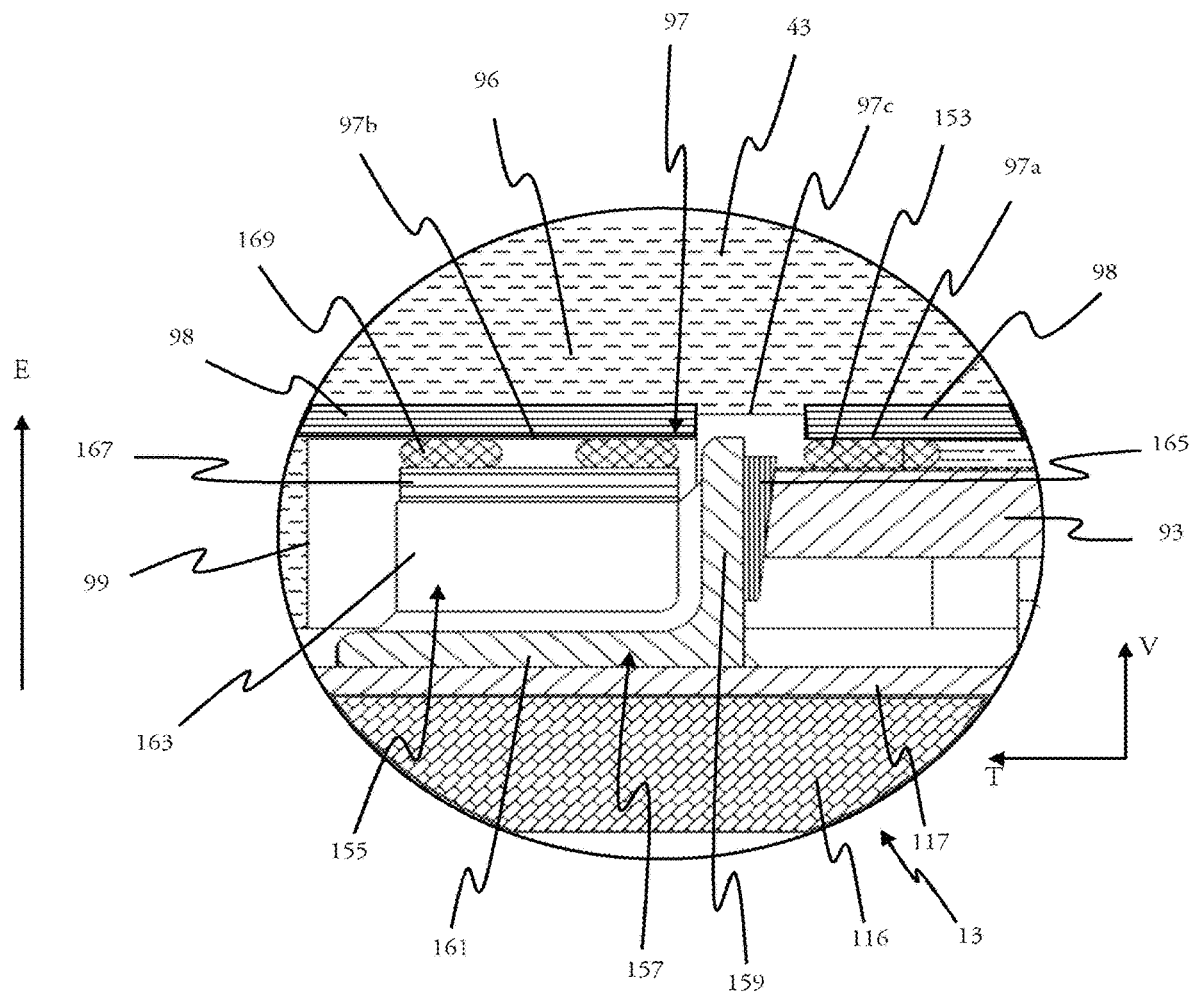
FIG. 5 is a detail view of a locking device of the guiding structure illustrated in FIG. 4.

Referring to FIG. 4 and to FIG. 5, the tank 21 comprises at least one blocking device 155 configured to immobilize the guiding structure 77 in at least one direction perpendicular to the thickness direction E of the bottom wall 27. The blocking device 155 described hereinafter may be independent of the fact that the thermally-insulating layer 41 includes the clearance 151 delimited in the thickness direction E of the bottom wall 27 by the portion 96 of the self-supporting heat-proof panel 43 and by the supporting structure 3, the clearance 151 being configured to accommodate at least in part the base of the guiding structure 77. Alternatively, the blocking device 155 described hereinafter may be intimately combined with the thermally-insulating layer 41 that includes the clearance 151 delimited in the thickness direction E of the bottom wall 27 by the portion 96 of the self-supporting heat-proof panel 43 and by the supporting structure 3, the clearance 151 being configured to accommodate at least in part the base of the guiding structure 77.

The blocking device 155 is arranged on the internal face of the internal partition wall of the double bottom partition wall in such a manner that the locking device 155 is accommodated in the clearance 151. The blocking device 155 is disposed between the lateral intermediate edge 99 of the self-supporting heat-proof panel 43 and the guiding structure 77, in particular its plate 93. A plurality of blocking devices 155 as described hereinafter are disposed peripherally around the guiding structure.

In the embodiment, the blocking device 155 includes an angle-iron 157 reinforced by a plurality of stiffeners 163. The angle-iron 157 has an L-shape profile, that is to say the angle-iron 157 includes a first section 159 and a second section 161 perpendicular to or substantially perpendicular to the first section 159. The first section 159 is developed in a plane including the thickness direction E of the bottom wall 27. In other words, the first section 159 extends in a plane perpendicular to the plane in which the plate 93 extends. The second section 161 is developed in a plane perpendicular to the thickness direction E of the bottom wall 27. In other words, the second section 161 is developed in a plane parallel to the plane in which the plate 93 extends.

The first section 159 is arranged against one of the peripheries of the guiding structure, in particular of the plate 93, while the second section 161 is arranged against the internal face of the internal partition wall 13 of the double bottom partition wall 5 while extending in a direction away from the periphery of the guiding structure, for example of the plate 93. The angle-iron 157 is fixed to the internal face of the internal partition wall 13 of the double bottom wall 5 by welding it thereto.

Each stiffener 163 has a rectangular parallelepiped shape. For each stiffener 163, one face of the stiffener 163 is arranged against the first section 159 and another face of the stiffener 163 is arranged against the second section 161. The stiffeners 163 are uniformly distributed along the angle-iron 157. Two adjacent stiffeners 163 are therefore at a non-zero distance from one another. The second section 161 is interrupted between two adjacent stiffeners 163. In other words, the second section 161 is formed of a plurality of legs. Each stiffener 163 is fixed to the first section 159 and to one leg of the second section 161 by welding it thereto.

The tank 21 includes a plurality of locking devices 155 that come up against each edge of the guiding structure, in particular of the plate 93, to immobilize the guiding structure in all directions perpendicular to the thickness direction E of the bottom wall 27. In other words, the locking devices 155 prevent movement of the guiding structure in directions contained in the plane in which the internal partition wall 13 of the plate 93 extends.

A blocking element 165 may be arranged against an edge of the guiding structure, in particular of the plate 93, and the first section 159 of the angle-iron 157 of the blocking device 155. The blocking element 165 therefore enables elimination of any play between the angle-iron 157 and the guiding structure, here the plate 93, whilst reinforcing the mechanical strength of the guiding structure. The blocking element 165 takes the form of a board, in particular of a wedge, featuring an acute angle along a longitudinal edge. The acute angle of the blocking element 165 is forcibly inserted after fixing the guiding structure 77 to the supporting structure 3 and after fixing the blocking device 155 all around the guiding structure, here the plate 93. The blocking element 165 is welded to the first section 159 of the blocking device 155 in order to prevent any vertical movement.

When the tank 21 is assembled the blocking device 155 is located in the clearance 151. Another portion 97b of the external intermediate face 97 of the upper intermediate portion 96 of the self-supporting heat-proof panel 43 of the secondary thermally-insulating layer 41 adjacent to the plate 93 comes to rest on stiffeners 163 of the blocking device 155.

To prevent any overhang of the self-supporting heat-proof panel 43 resting both on the guiding structure 77 and on the blocking device 155, a locking member 167, 169 is arranged between the blocking device 155 and the plywood or composite material board 98 arranged at the level of the external intermediate face 97 of the upper intermediate portion 96 of the self-supporting heat-proof panel 43 of the secondary thermally-insulating layer 41, coming to rest on the stiffeners 163 of the blocking device 155. In the embodiment illustrated in FIGS. 4 and 5 a first locking member 167 is a plywood insert and a second locking member 169 is a bead of mastic. The bead of mastic 169 is one of the elements that contributes to correct vertical positioning of the self-supporting heat-proof panel 43 and consequently defines the clearance 151. The mastic bead 169 therefore assures a locking function and a function of flatness of the components that rest on it.

Note that the board 98 includes a notch 97c in which extends at least the first section 159 of the blocking device 155. The vertical position of the guiding structure 77 varying as a function of its manufacturing tolerances, the notch 97c prevents any mechanical interference between the blocking device 155 and the self-supporting heat-proof panel 43 whatever the vertical position of that panel.

The self-supporting heat-proof panel 43 may also be prevented from overhanging by producing the notch 97c in the board 98 arranged at the level of the external intermediate face 97 of the self-supporting heat-proof panel 43 of the secondary thermally-insulating layer 41 adjacent to the plate 93. This notch 97c makes it possible to accommodate a vertical edge of the first section 159 of the angle-iron 157 of the locking device 155.

FIG. 5 also illustrates the composition of the internal partition wall 13 that includes the metal insert 117 to which the blocking device 155 is welded. The guiding structure also rests on this metal insert 117. Here the concrete part of the internal partition wall 13 is referenced 116.

Figure 6:
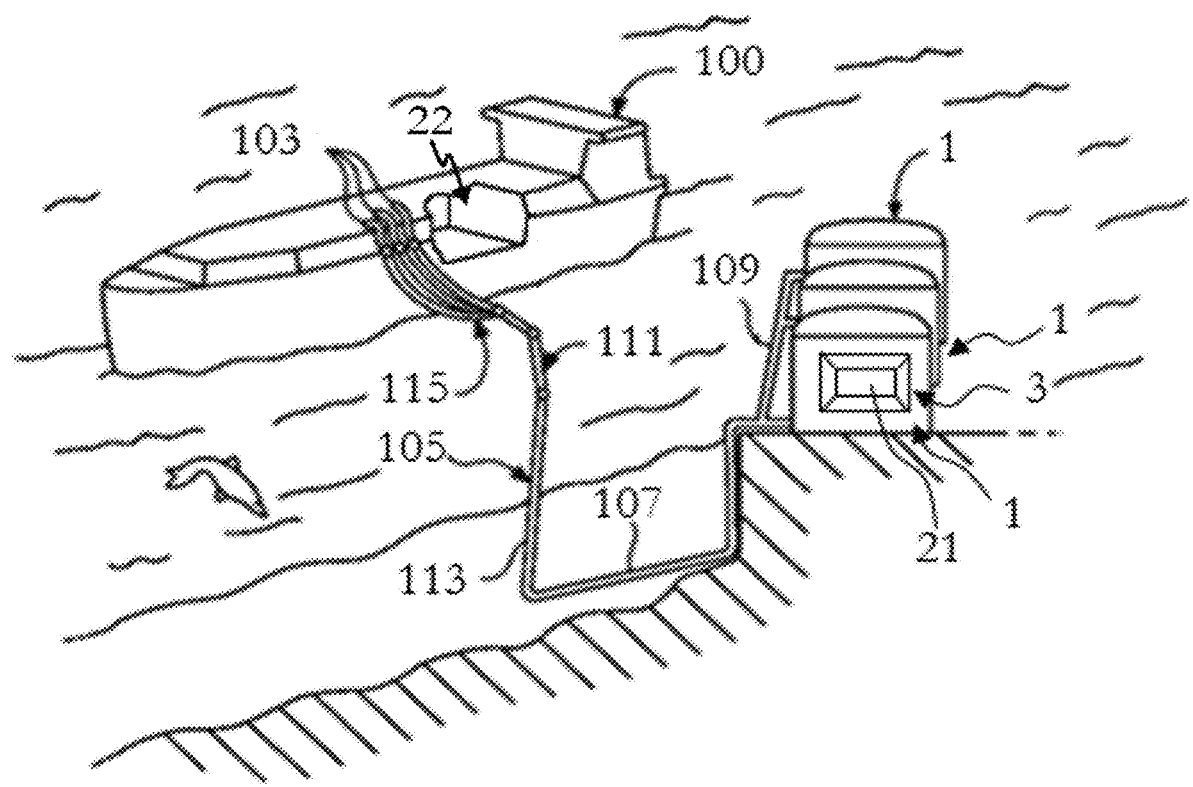
FIG. 6 is a schematic representation of a methane tanker tank and of a loading/offloading gravity platform including the tank according to the invention.

FIG. 6 shows the transport and/or storage tank 21 of parallelepipedal general shape mounted in the base structure 3 of a gravity platform 1. Gravity platforms 1 are generally offshore structures used in the context of oil or gas exploitation. These structures often have a concrete base structure known as a gravity-based structure (GBS); the term steel gravity structure (SGS) is also used for a base structure made of steel, to which the invention also applies.

The gravity platforms 1 may simultaneously have functions of a dyke, storage, a platform to receive a liquefaction plant and a loading dock in the context of exploitation of a liquefied gas such as for example liquefied natural gas or ethane.

The wall of the tank 21 includes a primary sealed membrane intended to be in contact with the LNG contained in the tank 21, a secondary sealed membrane arranged between the primary sealed membrane and the base structure 3 of the gravity platform 1, and two thermally-insulating layers respectively arranged between the primary sealed membrane and the secondary sealed membrane and between the second sealed membrane and the base structure 3. In a manner known in itself, loading/offloading pipes 103 disposed on the top deck of a methane tanker 100 may be connected by means of appropriate connectors to the gravity platform 1 to transfer a cargo of LNG from or to the tank 21.

FIG. 6 represents the gravity platform 1 including a loading and offloading station 105, an underwater pipe 107 and a gravity platform 1. The loading and offloading station 105 is a fixed offshore installation including a mobile alarm 111 and a tower 113 that supports the mobile arm 111. The mobile arm 111 carries a bundle of insulated flexible tubes 115 that can be connected to the loading/offloading pipes 103. The orientable mobile arm 111 adapts to all methane tanker loading gauges. A connecting pipe that is not represented extends inside the tower 113. The loading and offloading station 105 enables loading and offloading of at least one tank 22 of the methane tanker 100 from or to the gravity platform 1. The tank 22 of the methane tanker 100 may be a tank according to the invention. The gravity platform 1 includes at least one liquefied gas storage tank 21 according to the invention and connecting pipes 109 connected by the underwater pipe 107 to the loading or offloading station 105. The underwater pipe 107 enables the transfer of liquefied gas between the loading or offloading station 105 and the gravity platform 1 over a great distance, for example 5 km, which enables the methane tanker 100 to remain at a great distance from the coast during the loading and offloading operations. Pumps onboard the methane tanker 100 and/or pumps equipping the gravity platform 1 and/or pumps equipping the loading and offloading station 105 are used to generate the pressure necessary for the transfer of the liquefied gas.

Of course, the invention is not limited to the examples that have just been described and numerous adaptations may be applied to those examples without departing from the scope of the invention. Thus a transport and/or storage unit may include a tank 1, for example. Such transport and/or storage units may be a liquefied petroleum gas tanker, a barge, a reliquefication unit, a gasification unit, or a terrestrial structure, for example a terrestrial reservoir.

The invention as has just been described indeed achieves the aim set for it and makes it possible to propose a tank including a guiding structure for a liquefied gas loading/offloading tower the thermal insulation of which is improved as well as its mechanical strength with respect to operating loads and to accidental loads. Variants not described here may be arrived at without departing from the scope of the invention.

The invention claimed is:

1. A tank for the transport and/or the storage of a liquefied gas, comprising:
   a supporting structure,
   a plurality of walls each including in a thickness direction of the wall at least one thermally-insulating layer resting against the supporting structure and at least one sealed membrane resting on the thermally-insulating layer, the plurality of walls including at least one bottom wall, and
   a guiding structure configured to receive a tower for loading and/or offloading liquefied gas contained in the tank, the guiding structure being arranged against the supporting structure and extending at least in part inside the tank, the guiding structure including a base including at least one plate bearing against the supporting structure, the thermally-insulating layer including at least one self-supporting heat-proof panel that is at least in part disposed around the guiding structure,
   wherein the thermally-insulating layer includes a clearance delimited in the thickness direction of the bottom wall by a portion of the self-supporting heat-proof panel and by the supporting structure, the clearance being configured to accommodate at least in part the plate of the guiding structure, the plate extending in the clearance and in a plane perpendicular to the thickness direction of the bottom wall, the guiding structure bearing on the base formed at least in part by the plate that is in plane-on-plane contact against the supporting structure.

2. The tank as claimed in claim 1, wherein the clearance has a thickness between 25 mm and 70 mm inclusive.

3. The tank as claimed in claim 1, wherein the portion of the self-supporting heat-proof panel that delimits the clearance in the thickness direction includes a plywood or composite material board.

4. The tank as claimed in claim 1, wherein a part of the portion of the self-supporting heat-proof panel rests on the base of the guiding structure.

5. The tank as claimed in claim 4, wherein a spacer device is disposed between the base of the guiding structure and the part of the portion of the self-supporting heat-proof panel resting on the base of the guiding structure.

6. The tank as claimed in claim 5, wherein the spacer device is an insert or a bead of mastic or a combination of the two.

7. The tank as claimed in claim 1, wherein the clearance is delimited in a direction perpendicular to the thickness direction by an edge of the self-supporting heat-proof panel that extends between an external face of the portion of the self-supporting heat-proof panel and an internal face of the supporting structure and by the guiding structure.

8. The tank as claimed in claim 1, wherein a thermal insulation member is disposed between the base of the guiding structure and the supporting structure.

9. The tank as claimed in claim 1, further comprising at least one locking device accommodated in the clearance and configured to immobilize the guiding structure in at least one direction perpendicular to the thickness direction of the bottom wall.

10. The tank as claimed in claim 1, wherein the thermal-insulation layer is a secondary thermal insulation layer and the sealed membrane is a primary sealed membrane, and the tank including a primary thermally-insulating layer and a secondary sealed membrane, the secondary sealed membrane rests against the secondary thermally-insulating layer, the primary thermally-insulating layer rests against the secondary sealed membrane, and the primary sealed membrane rests against the primary thermally-insulating layer.

11. A gravity platform including a liquefied gas storage tank according to claim 1 and a tower for loading/offloading liquefied gas contained in the tank, the loading/offloading tower being configured to cooperate with the guiding structure of the tank.

12. The gravity platform as claimed in claim 11, further comprising a base structure to which the tank is anchored, the base structure being made of concrete.

13. A transfer system for a liquefied gas, the system including a gravity platform as claimed in claim 11, insulated pipes arranged in such a manner as to connect the tank installed in the base structure of the gravity platform to a ship and a pump for driving a flow of liquefied gas through the insulated pipes from the tank of the gravity platform to the ship.

14. A method of loading or offloading a gravity platform as claimed in claim 11, wherein a liquefied gas is routed through insulated pipes from the tank of the gravity platform to a ship.

* * * * *